(12) United States Patent
Kliber et al.

(10) Patent No.: US 11,499,609 B2
(45) Date of Patent: Nov. 15, 2022

(54) ROTARY TO LINEAR TORQUE TRANSMISSION DEVICE

(71) Applicant: Nexen Group, Inc., Vadnais Heights, MN (US)

(72) Inventors: Anthony Will Kliber, Andover, MN (US); Isaac Kenneth Klaehn, Stillwater, MN (US); Daniel Robert Berge, Herndon, VA (US)

(73) Assignee: Nexen Group, Inc., Vadnais Heights, MN (US)

( * ) Notice: Subject to any disclaimer, the term of this patent is extended or adjusted under 35 U.S.C. 154(b) by 0 days.

(21) Appl. No.: 17/048,815

(22) PCT Filed: Apr. 29, 2019

(86) PCT No.: PCT/US2019/029556
§ 371 (c)(1),
(2) Date: Oct. 19, 2020

(87) PCT Pub. No.: WO2019/212925
PCT Pub. Date: Nov. 7, 2019

(65) Prior Publication Data
US 2021/0116007 A1  Apr. 22, 2021

Related U.S. Application Data

(60) Provisional application No. 62/664,308, filed on Apr. 30, 2018.

(51) Int. Cl.
*F16H 19/04* (2006.01)
*F16H 55/10* (2006.01)
(Continued)

(52) U.S. Cl.
CPC ............. *F16H 19/04* (2013.01); *F16H 55/28* (2013.01); *F16C 29/02* (2013.01);
(Continued)

(58) Field of Classification Search
CPC .... F16H 19/02; F16H 19/04; F16H 2019/046; F16H 55/10; F16H 55/26; F16H 55/28; F16H 55/285; F16C 29/02; F16C 2361/61
See application file for complete search history.

(56) References Cited

U.S. PATENT DOCUMENTS 4,879,920 A * 11/1989 Kerkhoff ................. F16H 55/10
74/465
5,406,859 A    4/1995 Belford
(Continued)

FOREIGN PATENT DOCUMENTS

EP    0851150 A1    7/1998
FR    2029162 A5 * 10/1970 ............. F16H 55/10
(Continued)

*Primary Examiner* — Adam D Rogers
(74) *Attorney, Agent, or Firm* — Karin L. Williams; Alan D. Kamrath; Mayer & Williams PC

(57) ABSTRACT

A torque transmission device has a pinion that includes a plurality of rollers that mesh with a plurality of teeth of an output. Each roller is supported by a bearing having rotating bearing elements. A clearance compensation for the diametrical difference between a diameter of each roller and an inscribed diameter of the associated rotating bearing elements is included in the plurality of teeth of the output such that there is no interference between the plurality of rollers and the plurality of teeth.

7 Claims, 6 Drawing Sheets

(51) Int. Cl.
   *F16H 55/26* (2006.01)
   *F16H 55/28* (2006.01)
   *F16C 29/02* (2006.01)

(52) U.S. Cl.
   CPC .......... *F16C 2361/61* (2013.01); *F16H 55/10* (2013.01); *F16H 55/285* (2013.01); *F16H 2019/046* (2013.01)

(56) References Cited

U.S. PATENT DOCUMENTS

| | | | |
|---|---|---|---|
| 5,540,111 A * | 7/1996 | Barnett | B62M 1/24 |
| | | | 280/252 |
| 5,640,881 A | 6/1997 | Brackett | |
| 5,950,513 A | 9/1999 | Bourakovski | |
| 6,023,989 A | 2/2000 | Imase et al. | |
| 8,011,264 B2 | 9/2011 | Tsubono et al. | |
| 8,567,279 B2 | 10/2013 | Seto et al. | |
| 8,573,088 B2 | 11/2013 | Okamoto et al. | |
| 8,671,788 B2 * | 3/2014 | Lim | F16H 55/10 |
| | | | 74/89.11 |
| 8,893,569 B2 * | 11/2014 | Lim | F16H 55/10 |
| | | | 74/89.11 |
| 9,341,247 B2 * | 5/2016 | Lim | F16H 55/10 |
| 10,053,136 B2 | 8/2018 | Sakamoto et al. | |
| 10,072,743 B1 | 9/2018 | Wittig | |
| 10,221,886 B2 * | 3/2019 | Ozaki | F16H 55/10 |
| 2010/0024579 A1 | 2/2010 | Grossart | |
| 2011/0239795 A1 | 10/2011 | Uchida | |
| 2013/0031996 A1 * | 2/2013 | Imase | F16H 55/10 |
| | | | 74/465 |
| 2018/0135735 A1 * | 5/2018 | Brakes | B64C 13/34 |

FOREIGN PATENT DOCUMENTS

| | | | | |
|---|---|---|---|---|
| FR | 3032678 A1 * | 8/2016 | ............ | F16H 55/10 |
| JP | S62220763 A | 9/1987 | | |
| JP | 4516479 B2 | 8/2010 | | |
| JP | 4690858 B2 | 6/2011 | | |
| JP | 4909545 B2 | 4/2012 | | |
| JP | 2017100819 A | 6/2017 | | |
| WO | WO0190599 A1 | 11/2001 | | |

* cited by examiner

ROTARY TO LINEAR TORQUE TRANSMISSION DEVICE

TECHNICAL FIELD

The present invention relates to a rotary to linear torque transmission device and, more particularly, to a linear torque transmission device having a pinion that includes a plurality of rollers each supported by a bearing, with the plurality of rollers meshing with a plurality of teeth of an output, and with the device including a feature on the plurality of teeth that compensates for a radial clearance in the bearing.

BACKGROUND

Advances in transmission devices for converting rotary motion and torque to linear motion have found recent success in the industrial automation market. For example, U.S. Pat. No. 6,023,989 discloses a transmission device for converting a torque between rotary movement and linear movement. In particular, the transmission device disclosed therein includes a rack having a plurality of teeth and a pinion having rollers that mesh with the teeth of the rack. The industrial automation market is continually demanding products having higher precision to use in their machines. Thus, a need exists for a rotary to linear torque transmission device with enhanced motion precision.

SUMMARY

In an aspect of the invention, a torque transmission device includes a pinion having a plurality of rollers that mesh with teeth of an output. Each roller is supported by a bearing having rotating bearing elements. Each bearing includes a clearance between the roller and the rotating bearing elements, and the clearance may create an interference between at least one roller and at least one tooth of the teeth of the output. The teeth of the output include a clearance compensation that is equal to the diametrical difference between a diameter of each roller and an inscribed diameter of the associated rotating bearing elements, therefore, eliminating the chance of interference.

In another aspect of the invention, a method of compensating for dimensional clearances in a torque transmission device includes providing a rack having a plurality of teeth and a pinion having a plurality of rollers that mesh with the teeth of the rack. The method also includes providing bearings to rotationally support each roller, with each bearing having rotating bearing elements and with each bearing including a dimensional clearance that may create an interference between at least one roller and at least one tooth of the rack if not compensated for. In addition, the method includes providing a clearance compensation between the plurality of rollers and the bearings with the clearance compensation determined based upon the diametrical difference between a diameter of each roller and an inscribed diameter of the associated rotating bearing elements, and with the clearance compensation calculated and applied to a tooth profile of the teeth of the rack.

The illustrative embodiments will become clearer in light of the following detailed description described in connection with the drawings.

DESCRIPTION OF THE DRAWINGS

The illustrative embodiments may best be described by reference to the accompanying drawings where.

All figures are drawn for ease of explanation of the basic teachings of the present invention only; the extensions of the figures with respect to number, position, relationship, and dimensions of the parts to form the illustrative embodiments will be explained or will be within the skill of the art after the following description has been read and understood. Further, the exact dimensions and dimensional proportions to conform to specific force, weight, strength, and similar requirements will likewise be within the skill of the art after the following description has been read and understood.

DESCRIPTION OF THE ILLUSTRATIVE EMBODIMENTS

Figure 1:
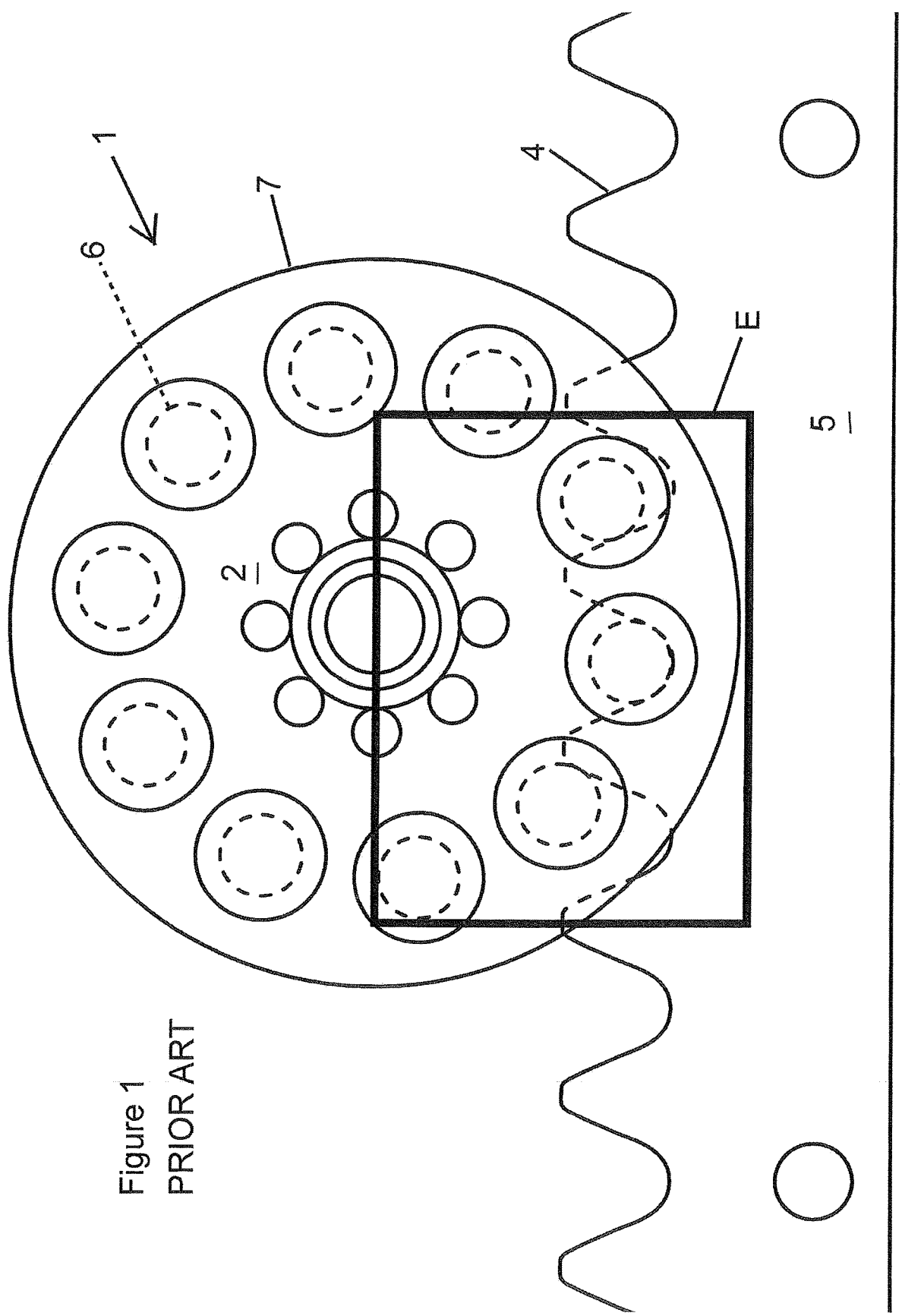
FIG. 1 shows a partial view of a conventional torque transmission device including a rack having a plurality of teeth and a pinion in which rollers are provided to mesh with the teeth of the rack.

Referring to FIG. 1, a torque transmission device 1 has a rack 5 having a plurality of teeth 4 and a pinion 7 in which rollers 6 are provided to mesh with the teeth 4 of the rack 5 to rotationally move the pinion 7 in unison with the input shaft 2. With rotary movement of the pinion 7, the rack 5 is slidingly driven. In this regard, the disclosure of U.S. Pat. No. 6,023,989 is hereby incorporated herein by reference, with the same reference numbers being utilized herein.

Figure 2:
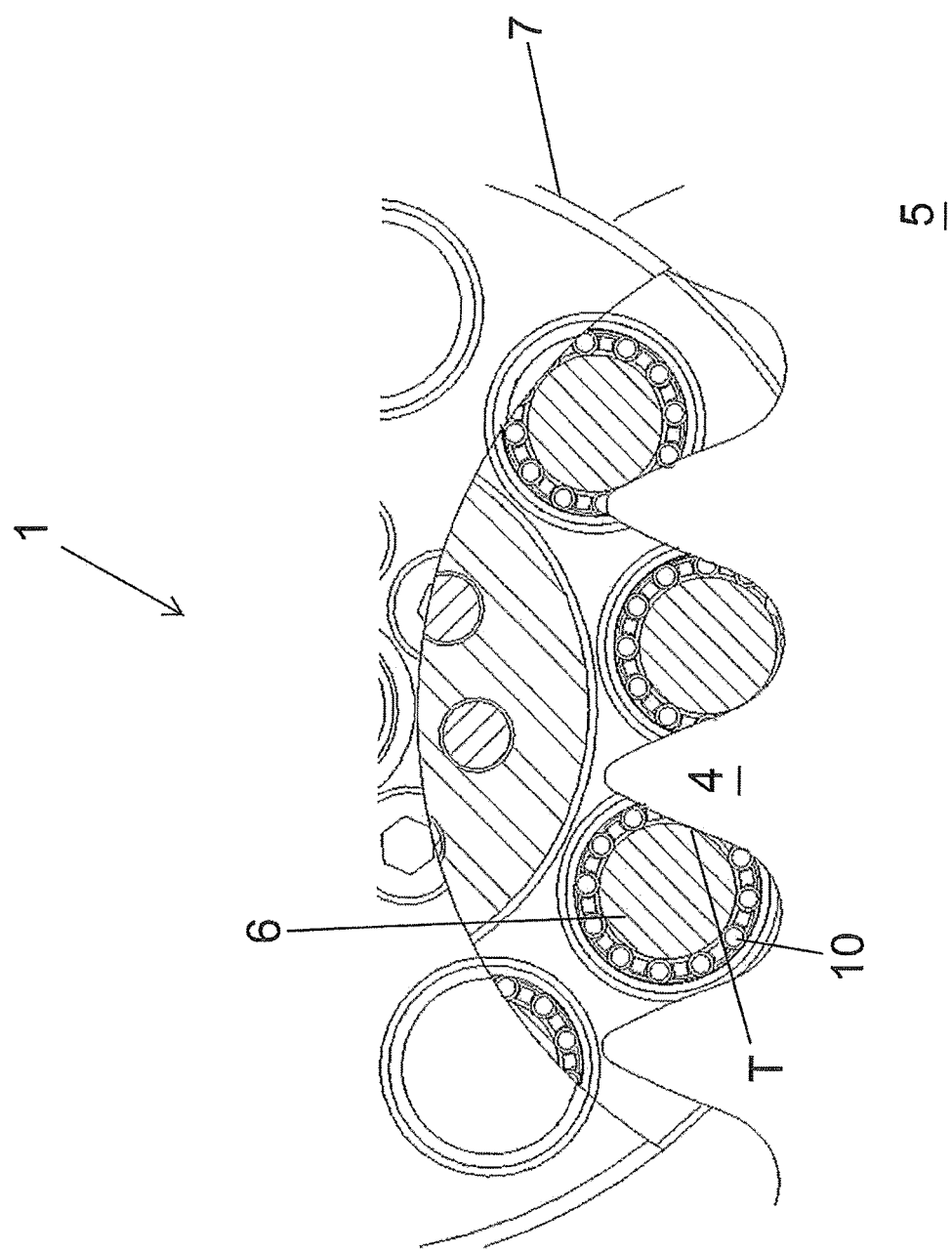
FIG. 2 is an enlarged view of enclosed section E of FIG. 1 and depicts a model of conventional torque transmission device technology.

Referring to FIG. 2, a schematic of a model of conventional torque transmission device technology such as that described in U.S. Pat. No. 6,023,989 is shown. Particularly, as shown in FIG. 2, the rollers 6 are fully supported by corresponding bearings 10 and one tangent at location T to the surface of the tooth 4 in the torque transmission device 1.

It is known that, in a torque transmission device such as that described in U.S. Pat. No. 6,023,989, the rollers 6 or rolling elements travel in a trochoidal motion that create a tooth profile with the governing parametric equations of:

$$X = R*\theta - PCD*\sin(\theta) + \left(\frac{\sin(\theta)}{(\sin(\theta)^2)^{\frac{1}{2}}}\right) * \left(\frac{d}{\left(1+\left(\frac{PCD*\cos(\theta)-R}{PCD*\sin(\theta)}\right)^2\right)^{\frac{1}{2}}}\right) \quad \text{Eqn. (1)}$$

$$Y = R - PCD*\cos(\theta) + \left(\frac{\sin(\theta)}{(\sin(\theta)^2)^{\frac{1}{2}}}\right) * \left(\frac{d*\left(\frac{PCD*\cos(\theta)-R}{PCD*\sin(\theta)}\right)}{\left(1+\left(\frac{PCD*\cos(\theta)-R}{PCD*\sin(\theta)}\right)^2\right)^{\frac{1}{2}}}\right) \quad \text{Eqn. (2)}$$

where X is the value of a trochoid on a horizontal x-axis, Y is the value of the trochoid on a vertical y-axis, R is the radius of a circle that the pinion will roll on in a trochoidal motion, Θ is the angle through which the circle is rotated, and PCD is the distance between center of the circle and a shifted profile line, and d is the radius of roller 6.

Figure 3:
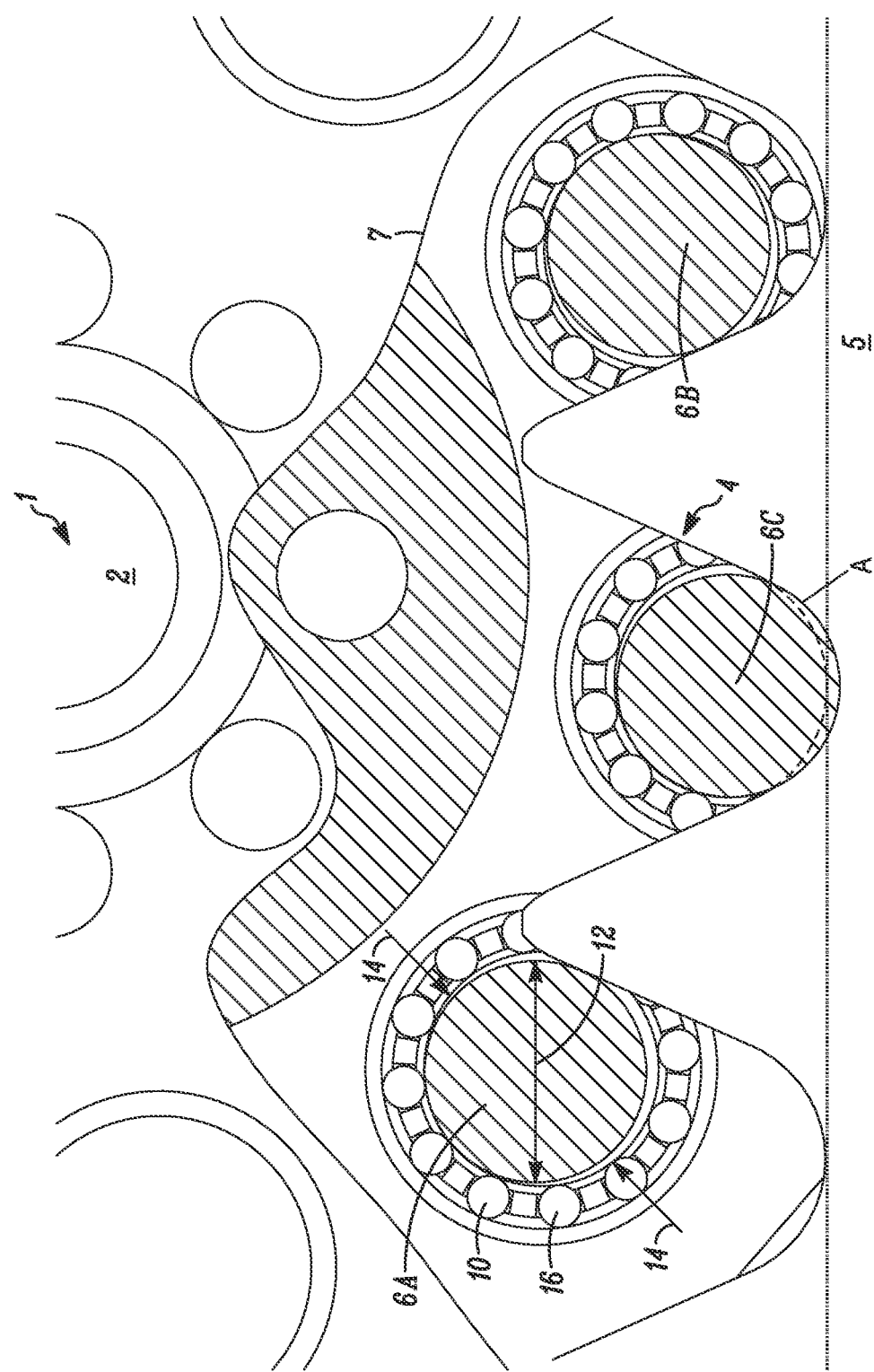
FIG. 3 shows a clearance C between the roller and bearing supporting the roller, and an interference A created due to a lack of compensation for the clearance in a traditional torque transmission device.

It was found by the inventors herein that different size bearings 10 created different clearances between rollers 6 and the inscribed circle created by bearing 10 and created different inaccuracies that were not accountable in predictive math models. Based upon this, the inventors herein found that there is another source of error that was undiscovered. Referring to FIG. 3, rollers 6 (for purposes of illustration, rollers 6A, 6B, 6C are shown) are supported by some type of bearing 10, most commonly needle bearings 10. These bearings 10 must have some clearance to compensate for machining tolerances and for part tolerances and to operate the bearing per the manufacturers' recommendations. The clearance causes the rollers 6 to not be located at the exact center of the rolling diameter where all traditional math models assume the center is located. However, two of the rollers (i.e. rollers 6A and 6B) shift out causing the middle roller 6C to contact the root of the tooth 4. This contact creates an interference area A and introduces an accuracy error. Thus, the model described in connection with FIG. 2 does not compensate for the clearance between the rollers 6 and the inscribed circles created by the supporting bearings 10.

The present invention compensates for the clearance between the rollers 6 and the supporting bearings 10. According to the present invention, a clearance component is added to the parametric equations:

$$X = R*\theta - PCD*\sin(\theta) + \left(\frac{\sin(\theta)}{(\sin(\theta)^2)^{\frac{1}{2}}}\right) * \left(\frac{d-c}{\left(1 + \left(\frac{PCD*\cos(\theta) - R}{PCD*\sin(\theta)}\right)^2\right)^{\frac{1}{2}}}\right) \quad \text{Eqn. (3)}$$

$$Y = R - PCD*\cos(\theta) + \left(\frac{\sin(\theta)}{(\sin(\theta)^2)^{\frac{1}{2}}}\right) * \left(\frac{(d-c)*\left(\frac{PCD*\cos(\theta) - R}{PCD*\sin(\theta)}\right)}{\left(1 + \left(\frac{PCD*\cos(\theta) - R}{PCD*\sin(\theta)}\right)^2\right)^{\frac{1}{2}}}\right) \quad \text{Eqn. (4)}$$

where X is the value of a trochoid on a horizontal axis, Y is the value of the trochoid on a vertical y-axis, R is the radius of a circle, Θ is the angle through which the circle is rotated, PCD is the distance between the center of the circle and shifted profile line, d is the roller size, and c is a clearance compensation. In accordance with the invention, the clearance compensation is the diametrical difference between the diameter 12 of the roller 6 and the inscribed diameter 14 of rotating bearing elements such as needle rollers 16 in the needle bearing 10.

Figure 4:
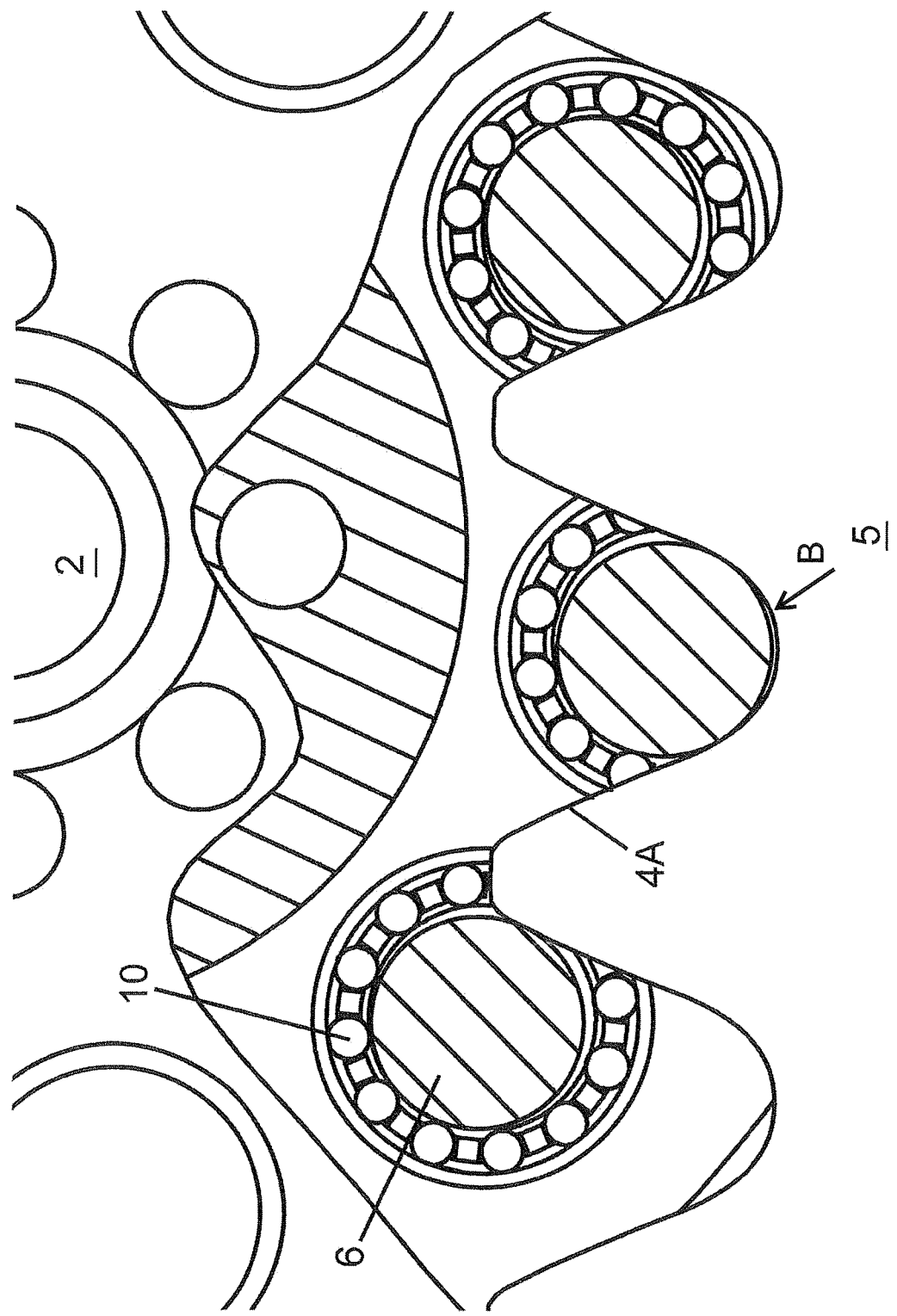
FIG. 4 depicts a form of tooth 4A that accurately transmits the rotary motion of the pinion into linear motion on a rack without unwanted interference.
Figure 5:
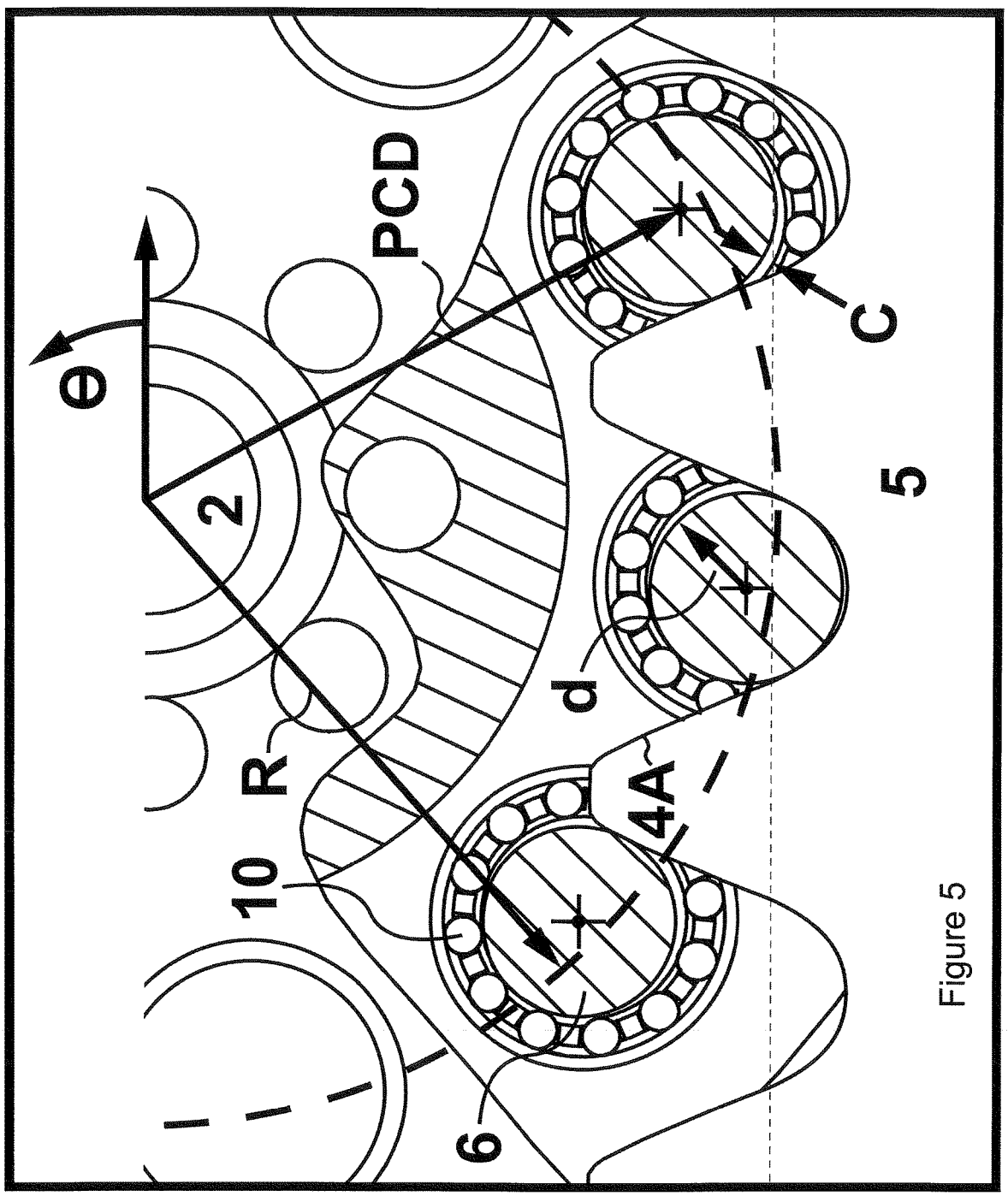
FIG. 5 depicts a form of tooth 4A from FIG. 4 including reference to terms in parametric equations including clearance compensation.

Referring to FIGS. 4 and 5, utilizing this math model provides a form of tooth 4A that accurately transmits the rotary motion of the pinion (i.e. roller 6 and bearings 10) into linear motion on racks 5 without unwanted interference at the root B of teeth 4A.

Figure 6:
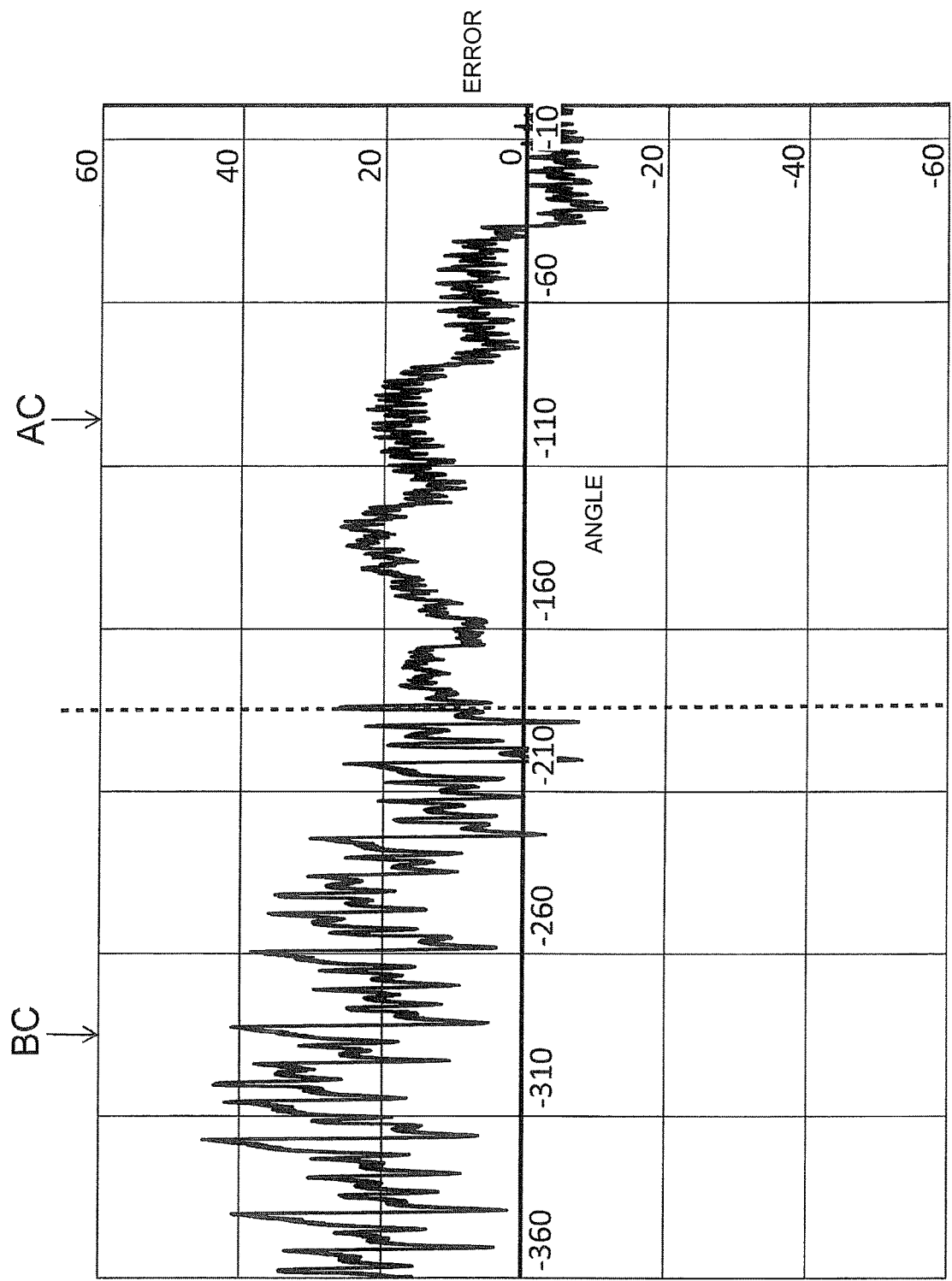
FIG. 6 is a chart showing position versus error of a torque transmission device in accordance with the invention before and after clearance compensation.

FIG. 6 is a chart of position verses error of the torque transmission device 1 with this roller compensation and also without this roller compensation. FIG. 5 shows there is a substantial improvement in the accuracy of the torque transmission device 1 between before compensation BC and after compensation AC.

Thus, since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A torque transmission device comprising, in combination:
an output having teeth; and
a pinion having a plurality of rollers that mesh with the teeth of the output,
wherein each of the plurality of rollers is supported by an associated bearing having rotating bearing elements and each bearing includes a clearance between the roller and the rotating bearing elements,
wherein the clearance creates an interference between at least one roller of the plurality of rollers and at least one tooth of the teeth of the output, and
wherein the teeth of the output are each formed with a profile that is offset by a clearance compensation that is equal to a diametrical difference between a diameter of each of the plurality of rollers and an inscribed diameter of the associated rotating bearing element.

2. The device of claim 1, wherein the plurality of rollers travel in a trochoidal motion, and wherein parametric equations for a trochoid that includes the clearance compensation are:

$$X = R*\theta - PCD*\sin(\theta) + \left(\frac{\sin(\theta)}{(\sin(\theta)^2)^{\frac{1}{2}}}\right) * \left(\frac{d-c}{\left(1 + \left(\frac{PCD*\cos(\theta) - R}{PCD*\sin(\theta)}\right)^2\right)^{\frac{1}{2}}}\right)$$

$$Y = R - PCD*\cos(\theta) + \left(\frac{\sin(\theta)}{(\sin(\theta)^2)^{\frac{1}{2}}}\right) * \left(\frac{(d-c)*\left(\frac{PCD*\cos(\theta) - R}{PCD*\sin(\theta)}\right)}{\left(1 + \left(\frac{PCD*\cos(\theta) - R}{PCD*\sin(\theta)}\right)^2\right)^{\frac{1}{2}}}\right)$$

where X is a value of a trochoid on a horizontal axis, Y is a value of the trochoid on a vertical y-axis, R is a radius of a circle, Θ is an angle through which the circle is rotated, PCD is a distance between the center of the circle and a shifted profile line, d is a roller diameter, and c is the clearance compensation.

3. The device of claim 1, wherein the teeth are defined in a rack or gear.

4. The device of claim 1, wherein the associated bearing is a needle bearing.

5. A method of compensating for dimensional clearances in a torque transmission device, comprising:
providing a rack having a plurality of teeth;
providing a pinion having a plurality of rollers that mesh with the plurality of teeth of the rack;
providing a bearing to rotationally support each roller of the plurality of rollers, with each bearing having rotating bearing elements, wherein the dimensional clearances are formed by each bearing including a dimensional clearance between each roller and the rotating bearing elements that creates an interference between at least one roller of the plurality of rollers and at least one tooth of the plurality of teeth of the rack; and providing a clearance compensation in a tooth profile of the plurality of teeth of the rack that is equal to a diametrical difference between a diameter of each roller of the plurality of rollers and an inscribed diameter of the rotating bearing elements of the plurality of rollers of the pinion.

6. The method of claim 5, wherein the plurality of rollers travel in a trochoidal motion, and wherein parametric equations for a trochoid that provide the clearance compensation are:

$$X = R*\theta - PCD*\sin(\theta) + \left(\frac{\sin(\theta)}{(\sin(\theta)^2)^{\frac{1}{2}}}\right) * \left(\frac{d-c}{\left(1 + \left(\frac{PCD*\cos(\theta) - R}{PCD*\sin(\theta)}\right)^2\right)^{\frac{1}{2}}}\right)$$

$$Y = R - PCD*\cos(\theta) * \left(\frac{\sin(\theta)}{(\sin(\theta)^2)^{\frac{1}{2}}}\right) * \left(\frac{(d-c)*\left(\frac{PCD*\cos(\theta) - R}{PCD*\sin(\theta)}\right)}{\left(1 + \left(\frac{PCD*\cos(\theta) - R}{PCD*\sin(\theta)}\right)^2\right)^{\frac{1}{2}}}\right)$$

where X is a value of a trochoid on a horizontal axis, Y is a value of the trochoid on a vertical y-axis, R is a radius of a circle, $\Theta$ is an angle through which the circle is rotated, PCD is a distance between the center of the circle and a shifted profile line, d is the roller diameter, and c is the clearance compensation.

7. The method of claim 5, wherein the bearing is a needle bearing.

\* \* \* \* \*